Aug. 14, 1945.      G. F. HANDLEY      2,382,875
ANTIGLARE DEVICE
Filed Feb. 2, 1944
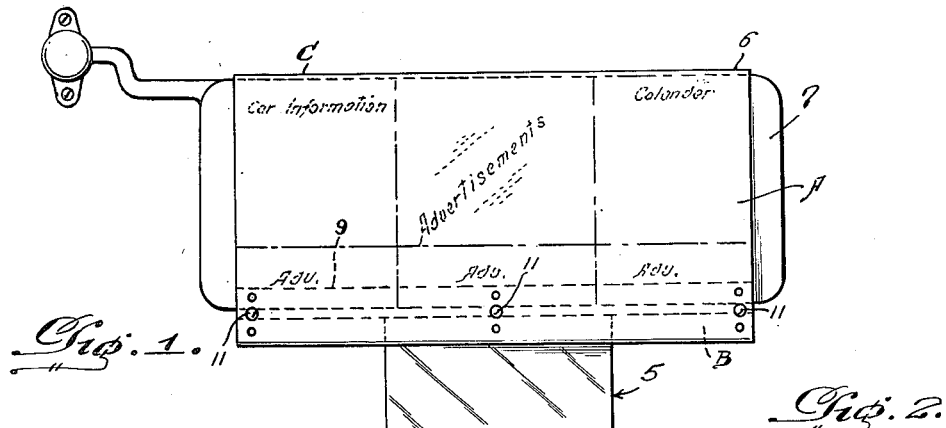
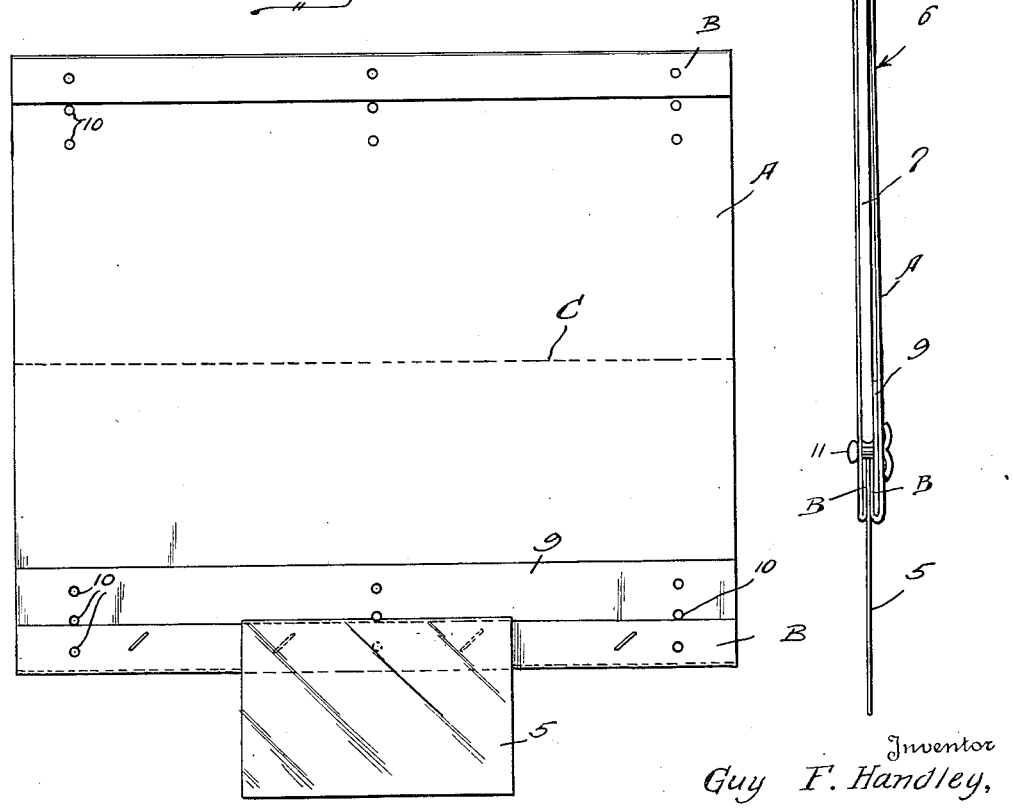
Inventor
Guy F. Handley,
Attorneys Patented Aug. 14, 1945

2,382,875

UNITED STATES PATENT OFFICE 2,382,875

ANTIGLARE DEVICE

Guy F. Handley, Minneapolis, Minn.

Application February 2, 1944, Serial No. 520,799

1 Claim. (Cl. 296—97)

This invention relates to an anti glare device for motor vehicles, and has for the primary object the provision of a device of the stated character which is in the form of an attachment for an adjustable shade or sun visor of the motor vehicle, whereby a person of said vehicle on having the vision affected by a glaring light may quickly adjust the visor to position the attachment in the range of the vision to diffuse the light and thereby eliminate glare, the device being especially adaptable for use by the driver of the vehicle to permit the driver to better see the road when approaching another automobile equipped with glaring lights.

Another object of the invention is the provision of a device of the above stated character which is constructed to permit its easy and quick application to visors of different sizes and provides ample space for advertisement and information of interest to the driver of the vehicle.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a front elevation illustrating a sun shade or visor of a motor vehicle equipped with an attachment constructed in accordance with my invention.

Figure 2 is an end elevation illustrating the attachment applied to the shade or visor.

Figure 3 is a plan view illustrating the blank from which the attachment is constructed.

Referring in detail to the drawing, the numeral 5 indicates a glare eliminating panel made from a material which is semi-transparent in order that it may be seen through but which will diffuse a strong light so as to eliminate glare from affecting the vision of a person looking through the panel 5. A mounting sleeve 6 is connected to the panel 5 and may be readily positioned on a sun visor or shade 7 of a conventional construction and which is found in present day motor vehicle equipment. The sleeve 6 frictionally fits the sun visor or shade 7 and provides a large area which may be divided into spaces by lines or similar markings, as shown in Figure 1. The spaces are utilized for advertisement, car information and calendar.

It is preferable that the sleeve be made of a good quality of paper or similar material on which matter may be printed or otherwise applied. The sleeve when positioned on the sun visor or shade 7 also may act as a holder for road maps, identification cards and the like by arranging such matter between a wall of the sleeve and the sun visor or shade.

The sleeve supports the panel 5 at one longitudinal edge of the sun visor or shade so that when the latter is brought into an operative position with respect to a person seated in the vehicle, the panel 5 will be arranged within the vision of said person so that on approaching another vehicle having glaring headlights the person can readily see the road without being blinded from the headlights by looking directly through the panel 5. Of course, when no need of the panel 5 is necessary the driver may either look under the panel 5 or to either end thereof in order to see the road. Of course, when the sun visor 7 is arranged at an inoperative position the panel 5 moves therewith leaving the driver of the vehicle with a complete normal range of vision from the motor vehicle.

The sleeve is made from a blank A opposite longitudinal edges of which are folded back upon itself to form reinforced portions B, one of which has a substantially rigid strip 9 arranged therein to provide sufficient rigidity to the sleeve beyond one longitudinal edge of the sun visor or shade. The blank A is folded on itself at the line indicated at C bringing the reinforced edges B opposite to each other. The walls of the sleeve adjacent the free longitudinal edges are equipped with aligned openings 10 through which brads or similar fasteners 11 may be passed for securing the opposite walls of the sleeve together and permitting the sleeve to be adjusted to accommodate sun shades or visors of different sizes. The panel 5 may be secured to one wall of the sleeve in any well known manner, as shown in Figure 2, and projects a considerable distance beyond the free longitudinal edge of the wall.

Thus it will be seen that a very efficient anti glare device has been provided which can be economically manufactured and easily applied and removed from a sun visor or shade when desired.

While I have shown and described the preferred embodiment of my invention, it will be understood that minor changes in construction, combination and arrangement of parts may be made without departing from the spirit and scope of the invention as claimed.

Having thus described my invention, what I claim is:

In an anti glare device, a glare eliminating panel, a sheet of material foldable upon itself and having one edge secured to said panel, a reinforcing strip secured to said sheet adjacent the latter named edge, said sheet having aligned rows of openings adjacent the free edges, and fasteners to extend through selected openings for bringing the sheet taut on a shade visor of a motor vehicle after the application of the sheet thereto.

GUY F. HANDLEY.